United States Patent

[11] 3,598,422

| [72] | Inventor | Gunter Strauff<br>Kaarst, Germany |
|---|---|---|
| [21] | Appl. No. | 1,646 |
| [22] | Filed | Jan. 9, 1970 |
| [45] | Patented | Aug. 10, 1971 |
| [73] | Assignee | Langen & Co.<br>Germany |

[54] SPRING SUSPENSION SYSTEM FOR VEHICLES PROVIDED WITH AUTOMATIC LOAD COMPENSATION
6 Claims, 2 Drawing Figs.

[52] U.S. Cl. .................................................. 280/124,
280/6, 267/34
[51] Int. Cl. ........................................................ B60g 17/00
[50] Field of Search ............................................ 280/124 F,
6 H, 6.1; 267/34, 65

[56] References Cited
UNITED STATES PATENTS
| 3,123,349 | 3/1964 | Cislo ............................. | 280/6 H |
| 3,150,867 | 9/1964 | Droegkamp ................. | 280/6 H |

*Primary Examiner*—Philip Goodman
*Attorney*—Holman, Glascock, Downing & Seebold ABSTRACT: A resilient suspension assemblage for vehicles provided with automatic load compensation means in which a compression spring operably connected with a wheel axle or guide rail is related to the vehicle chassis via the moving component of a piston-cylinder unit including a fixed component secured to the chassis and the moving component and a liquid cushion of variable size contained within the pressure space of the piston-cylinder unit, with the pressure chamber being so connected in dependence on load variations via a level-regulating device either with a pressure source or a drain or outlet that the distance between the chassis and the axle or guide rail is set to a predetermined value.

3,598,422

SPRING SUSPENSION SYSTEM FOR VEHICLES PROVIDED WITH AUTOMATIC LOAD COMPENSATION

BACKGROUND OF THE INVENTION

The present invention relates to a resilient suspension system for ground vehicles equipped with automatic load compensation means.

Such spring suspensions operate, as can be seen, for example, in German Pat. No. 1,125,290 with level-regulating devices arranged exteriorally of the piston-cylinder assemblage. The requirement for external linkages and level-regulating valves must be viewed as a disadvantage in certain exceptional situations particularly where there is limited space for installation.

It is therefore a salient object of this invention to overcome such disadvantages and provide a resilient suspension of the above-described type in which all components necessary for the operation thereof are combined in a compact unit.

SUMMARY OF THE INVENTION

The present invention solves the problem in that the level-regulating device includes a slide means arranged slidably in the head of the fixed component having an end face projecting into the pressure space and admitted thereby the pressure in the pressure space and a spring bearing against the movable part while the other end face of the slide means is admitted by a constant lower preferably atmospheric pressure and a spring with the latter spring tending to displace the slide means into a position in which the slide means connects the pressure space with the outlet or drain while the spring bearing against the movable part in conjunction with the pressure in the pressure space tends to displace the slide means into a position in which the pressure space is connected with the pressure source. In view of the fact that the level regulation does not depend upon the road, but is effected by different pressures in the pressure space caused by load variations, the effective surfaces of the slide means and the movable component or the spring ratings of the springs must be in a certain ratio.

If the existing friction influences are disregarded, there is obtained an accurate level regulation if the ratio of the spring rating of the spring acting between the slide means and the movable part to the spring rating of the spring acting between the movable part and the axle is the same as that of the effective surface of the slide means to the effective surface of the movable part, reduced by the effective surface of the slide means. The force of the spring acting between the head of the fixed component and the slide means must be equal to the force acting on the slide means, which is composed of compressive force and the force of the spring arranged in the pressure space, at least in the desired level position of the vehicle.

The surface and the springs can also naturally be such that a certain resilience of the vehicle is obtained and such a measure can be efficacious, for example, if only one axle of the vehicle such as the rear axle is level regulated since a ground parallel position of the vehicle can then still be realized.

Further important objects and advantages of the present invention will become more readily apparent to persons skilled in the art from the following detailed specification and annexed drawings and in which drawings:

DETAILED DESCRIPTION OF THE INVENTION

Figure 1:
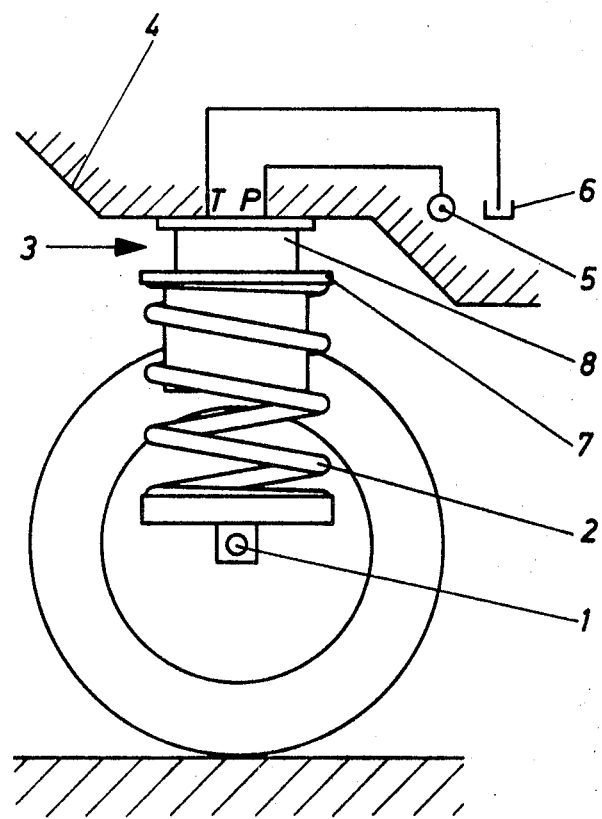
FIG. 1 is a diagrammatic view illustrating the arrangement of a resilient suspension assemblage according to the invention between the axle and chassis of a vehicle.

It will be noted in FIG. 1 that an axle 1 of a vehicle bears against chassis 4 of the vehicle via a spring 2 and a piston-cylinder unit 3. A source of pressure 5 is connected with a connection P and an outlet or drain 6 with a connection T of the piston-cylinder unit 3. More particularly, the piston cylinder unit 3 includes a cylinder 7 within which a piston 8 having an effective surface F is slidably mounted. The cylinder 7 is formed with a flange 7a adjacent its open end and the flange serves as an abutment for the spring 2.

A second spring 9 is positioned in a pressure space 10 defined between the piston 8 and the cylinder 7. One end of the spring 9 bears against the cylinder 7 and the other end against a slide means 11 slidably mounted in head 12 of the piston 8 and the slide means has an effective surface $f$. The slide means 11 on its opposite end face is loaded by a spring 13 which bears with its opposite end against the interior of an adjustable plug or closure 14.

The connection P can be connected with the pressure space 10 via a duct 15, a spring-loaded nonreturn valve 16, a duct 17, an annular duct 19 closed in the level position of the vehicle by a shoulder 18 of the slide means 11, a groove 20 in the slide means 11 adjacent the shoulder 18 and a duct 21.

The connection T may be connected with the pressure space 10 by way of a duct 22, a spring-loaded nonreturn valve 24 which opens in the direction of the pressure space 10 and whose ball can be moved to the open position by a piston 23, a duct 25, annular duct 26 which is closed in the level position of the vehicle by a shoulder 27 on the slide means 11, the groove 20 adjacent the shoulder 18 and the duct 21 which terminates in the area of the groove 20.

The slide means 11 at its end adjacent the spring 13 is provided with a collar 28 of slightly less diameter than bore 29 which surrounds the collar. An annulus 31 defined between the perimeter of the collar 28 the bore 29 and the head 12 is connected by a duct 31 having a restrictor 32 with the duct 25. The spring rating of the spring 13 is denoted C1, the spring 9 as C2 and spring 2 as C3. The piston 23 is provided with a pressure space 33 and the space 33 is connected with the duct 15 by way of a duct 32.

Figure 2:
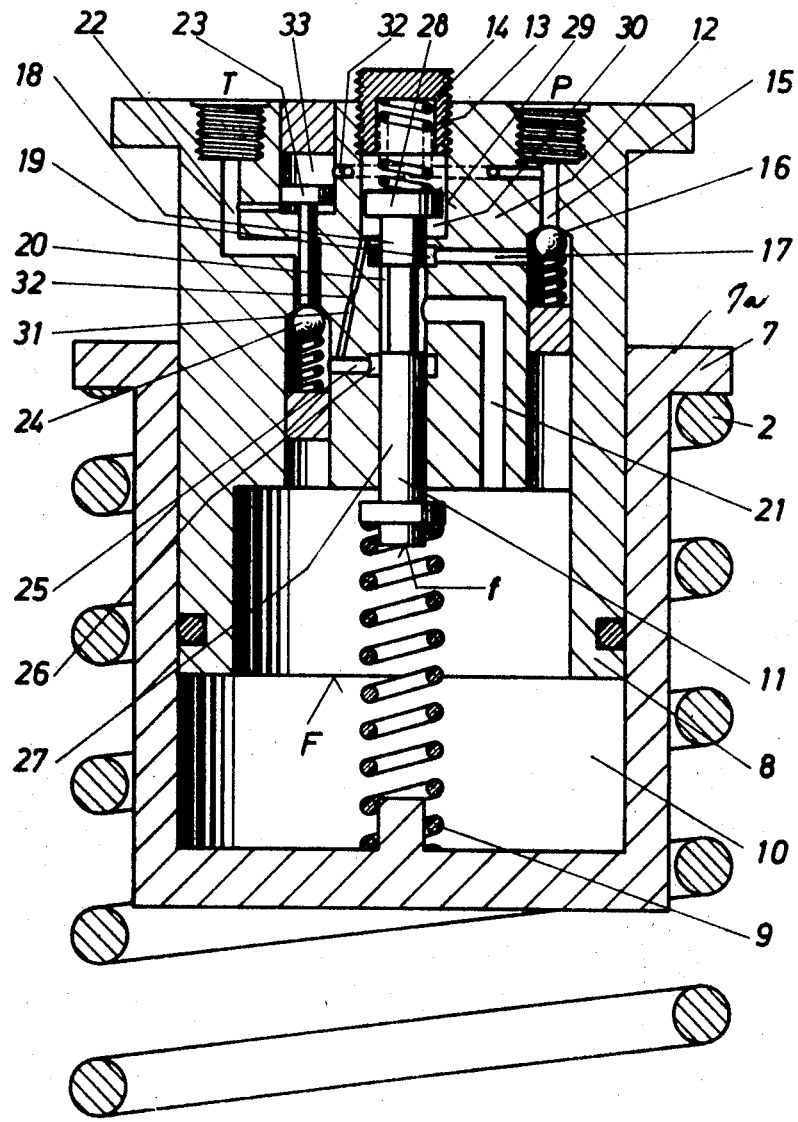
FIG. 2 is a view in vertical section through the resilient suspension assemblage.

The operation of the resilient suspension system is as follows:

Assuming that the vehicle provided with a certain load is in its theoretical level position and that the spring suspension system is in condition illustrated in FIG. 2, if the load increases, the pressure in the pressure space 10 will first rise. This pressure increase which initially causes no change in the volume of the pressure space 10 acts on the surface $f$ of the slide means 11. In view of the fact that the forces of the springs 14 and 9 have, at first, remained equal, the slide means 11 is raised upwardly by the increase in pressure so that the shoulder 18 opens the flow path defined by components P, 15, 16, 17, 19, 20, and 21. Hence, liquid flows into the pressure space 10 and effects a downward movement of the cylinder 7. By virtue of this downward movement of the cylinder 7, the spring 9 relaxes and the force acting on the slide means 11 against the force of the spring 14 diminishes until finally the force of the spring 13 again slightly predominates and displaces the slide means 11 downwardly until the shoulder 18 again blocks the connection between the connection P and the pressure space 10.

On the other hand, if the load of the vehicle diminishes, the pressure in the pressure space 10 decreases and the spring 13 forces the slide means 11 downwardly so that the shoulder 27 opens the connection between the pressure space 10 and the connection T. Liquid can then flow from the pressure space 10 and the pressure space 10 is reduced with the spring 9 being tightened. Finally, the force of the spring 9 predominates and the pressure acting on the surface $f$ of the slide means 11 is greater than the force of the spring 13 whereby the slide means 11 is raised until the shoulder 27 again interrupts the connection between the pressure space 10 and the connection T.

A prerequisite for an accurate level regulation is that the stroke of the cylinder 7 must compensate for longitudinal variations of the spring caused by the load variations. This is always the case when $$C2/C3 = f/F - f$$

By the selection of suitable parameters such as the construction weight of the vehicle, the surfaces $F$ and $f$, initial pressure, spring ratings etc., it is possible to calculate the other quantities. A variation of the initial stress of the spring 13 by means of the plug or closure 14 causes a shift in the level position of the vehicle. Starting from a middle level position, an increase of the initial stress means a lowering of the vehicle and on the other hand a reduction of the initial stress means a raising of the vehicle. It is also possible, for example, by varying the spring rating $C2$ to realize deviations from an accurate level position. For example, such a deviation is desired if only one axle is level regulated for the vehicle since the other axle springs more or less are in dependence on the load and the vehicle would be tilted or slanted with a precise level regulation. The narrow annular gap or hiatus between the collar 28 and the bore 29 as well as the restrictor 32 in the duct 31 effect a damping of the movement of the slide means 11 thereby ensuring that a level regulation does not occur at any distance variation caused, for example, by unevenness of the road or surface being travelled.

The invention is not restricted to the precise details illustrated and in particular the slide means can be of different structural arrangements as well as the abutments for the spring being of different design. It is not necessary to arrange the nonreturn valves in the piston head and such valves can be located exteriorly of the piston-cylinder unit if there is no objection to a slow lowering of the vehicle while stationary, the installation can be completely foregone.

I claim:

1. A resilient suspension system for wheeled vehicles having a chassis and provided with automatic load compensation means including a compression spring operably connected with a wheel axle or guide rail and operably related to the chassis via a piston-cylinder unit including a fixed component secured to the chassis and a moving component together with a liquid cushion of variable size within a pressure space of the piston-cylinder unit with such pressure space being so connected in dependence on load variations by means of a level-regulating device either with a source of pressure or a drain at the distance between the chassis and wheel axle or guide rail is set to a predetermined value, in which the improvement comprises said level-regulating device including a slide means, said fixed component having a head in which said slide means is slidably mounted, said slide means having an end face projecting into the pressure space and being admitted therein by the pressure in the pressure space and a spring bearing against the movable component, said slide means having an opposite end face subjected to the action of a constant lower atmospheric pressure and a further spring tending to displace the slide means to a position in which it provides communication between the pressure space and the drain and said first-named spring in conjunction with the pressure in the pressure space tending to displace said slide means into a position in which said pressure space is connected with the source of pressure.

2. The resilient suspension system as claimed in claim 1 in which the ratio of the spring rating of the spring acting between the slide means and the movable part to the spring rating of the spring acting between the movable part and the axle is the same as the ratio of the effective surface of the slide means to the effective surface of the movable component reduced by the effective surface of the slide means.

3. The resilient suspension system as claimed in claim 2 including nonreturn valve means arranged in the connection between the source of pressure and the pressure space between the slide means and the connection to the source of pressure, said nonreturn valve means opening in a direction towards the pressure space.

4. The resilient suspension system as claimed in claim 3 including a nonreturn valve means for closing in the direction of the drain arranged in the flow path from the pressure space to the drain and means operably related to such nonreturn valve means for opening such valve means by the pressure of the source of pressure.

5. The resilient suspension system as claimed in claim 1 in which the force of the spring tending to displace the slide means into a position in which it connects the pressure space with the drain is adjustable.

6. The resilient suspension system as claimed in claim 1 in which said slide means is provided with a collar at its end in proximity to the spring tending to bring the slide means into a position in which it connects the pressure space with the drain with said collar being of slightly lesser diameter than the bore surrounding said collar and with an annular space defined between said collar and bore being connected with a duct via a duct having a restrictor provided therein.

UNITED STATES PATENT OFFICE
CERTIFICATE OF CORRECTION

Patent No. 3,598,422          Dated August 10, 1971

Inventor(s) Günther STRAUFF

It is certified that error appears in the above-identified patent and that said Letters Patent are hereby corrected as shown below:

Correct the spelling of the inventor's first name to read -- Günther --.

Signed and sealed this 3rd day of July 1973.

(SEAL)
Attest:

EDWARD M. FLETCHER, JR.                Rene Tegtmeyer
Attesting Officer                      Acting Commissioner of Patents